US009641559B2

(12) United States Patent
Maistri et al.

(10) Patent No.: US 9,641,559 B2
(45) Date of Patent: May 2, 2017

(54) METHODS AND SYSTEMS FOR DYNAMIC ADJUSTMENT OF SESSION PARAMETERS FOR EFFECTIVE VIDEO COLLABORATION AMONG HETEROGENEOUS DEVICES

(71) Applicant: SwyMe IP BV, Noordwijk (NL)

(72) Inventors: Paolo Maistri, Verona (IT); Stefano Migliorisi, Washington, DC (US); Giannantonio Costermani, Verona (IT)

(73) Assignee: SWYME IP BV, Noordwijk (NL)

( * ) Notice: Subject to any disclaimer, the term of this patent is extended or adjusted under 35 U.S.C. 154(b) by 0 days.

(21) Appl. No.: 14/774,077

(22) PCT Filed: Mar. 18, 2014

(86) PCT No.: PCT/US2014/031065
§ 371 (c)(1),
(2) Date: Sep. 9, 2015

(87) PCT Pub. No.: WO2014/146100
PCT Pub. Date: Sep. 18, 2014

(65) Prior Publication Data
US 2016/0021149 A1 Jan. 21, 2016

Related U.S. Application Data

(60) Provisional application No. 61/799,269, filed on Mar. 15, 2013.

(51) Int. Cl.
*H04N 7/14* (2006.01)
*H04L 29/06* (2006.01)
*H04L 12/28* (2006.01)
*H04N 7/15* (2006.01)

(52) U.S. Cl.
CPC .......... *H04L 65/1069* (2013.01); *H04L 12/28* (2013.01); *H04L 65/403* (2013.01); *H04L 65/602* (2013.01); *H04L 65/80* (2013.01); *H04L 69/16* (2013.01); *H04N 7/147* (2013.01); *H04N 7/15* (2013.01); *H04L 65/4069* (2013.01)

(58) Field of Classification Search
CPC .......... H04N 7/147; H04N 7/15; H04N 7/141; H04N 7/148; H04N 7/152; H04N 7/155
USPC ................. 348/14.01, 14.08, 14.12
See application file for complete search history.

(56) References Cited

U.S. PATENT DOCUMENTS

| 8,665,313 B2* | 3/2014 | Li ............ H04N 7/152 348/14.09 |
| 2003/0023672 A1* | 1/2003 | Vaysman ............ H04L 12/1827 709/203 |
| 2004/0034723 A1 | 2/2004 | Giroti |

(Continued)

OTHER PUBLICATIONS

International Search Report of PCT/US2014/031065 dated Aug. 27, 2014.

*Primary Examiner* — Quoc D Tran
(74) *Attorney, Agent, or Firm* — Arent Fox LLP (57) ABSTRACT

Methods and systems for maximizing the quality perceived by the user in a software-based, multi-point video conference or collaboration session between devices that are potentially different (e.g., devices from different vendors, devices with different operating systems, devices on different networks, devices that function as servers, clients or both) and maintaining the quality over time.

20 Claims, 10 Drawing Sheets

(56) References Cited

U.S. PATENT DOCUMENTS

| | | |
|---|---|---|
| 2004/0179591 A1 | 9/2004 | Wenger et al. |
| 2009/0225670 A1* | 9/2009 | Leung .................. H04L 41/022 370/252 |
| 2011/0096673 A1* | 4/2011 | Stevenson ............... H04M 3/50 370/252 |
| 2013/0077486 A1* | 3/2013 | Keith .................. H04L 47/2433 370/230.1 |

* cited by examiner

Data Packets

| 0 | 1 | 2 | 3 | 4 | 5 | 6 | 7 | 8 | 9 | 10 | 11 |
|---|---|---|---|---|---|---|---|---|---|----|----|
| ID | Size | | Time code | | | | Profile | Channel | | Subchannel | Streaming data |

Fig. 8

Atomic Streaming Packets

| 0 | 1 | 2 | 3 | 4 | 5 | 6 | 7 | 8 | 9 | 10 | 11 | 12 |
|---|---|---|---|---|---|---|---|---|---|----|----|----|
| ID | Size | | Source Peer ID | | | | Session ID | Sequence Number | | | | Streaming packet |

Non-atomic Streaming Packets

| 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| ID | Size | | Source Peer ID | | | | Session ID | Sequence Number | | | | Blocks count | | Blocks index | | Streaming packet portion |

METHODS AND SYSTEMS FOR DYNAMIC ADJUSTMENT OF SESSION PARAMETERS FOR EFFECTIVE VIDEO COLLABORATION AMONG HETEROGENEOUS DEVICES

RELATED APPLICATION(S)

This application is a National Stage entry of International Application No. PCT/US2014/031065, filed Mar. 18, 2014, which claims priority to U.S. Application No. 61/799,269, titled "Methods and Apparatuses for Dynamic Adjustment of Session Parameters for Effective Video Collaboration Among Heterogeneous Devices," filed Mar. 15, 2013, each of which is incorporated herein by reference in its entirety.

BACKGROUND OF THE INVENTION

Video conferencing and collaboration are used by a limited number of businesses worldwide due to its high costs, dedicated hardware, heavy use of bandwidth, and complexity.

While video conferencing devices are typically based on the H.323 standard to ensure interoperability, devices made by different manufacturers are still not always able to "talk" to each other during a video conference or other collaboration session.

The advent of the Internet, but especially the increase of available bandwidth on the network, combined with the increase in computational capabilities of computers and mobile devices, has allowed the creation of software capable of video communication, using "low-cost" devices compared to the H.323 systems. These software programs have allowed video conferencing to spread to a much wider audience and, more importantly, heterogeneous devices. There are a great number of hardware devices that can be turned into a "video device," able to encode audio and video locally and decode/play back audio and videos received from remote locations.

Thus, there are now two worlds: those with low cost/low quality software-based solutions, and those with high cost/high quality hardware based solutions. These two worlds are usually isolated, as companies often purchase software only solutions for employee desktops, and high quality solutions for executive meetings/conference rooms.

There remains an unmet need for a single software solution that may cover both requirements, i.e., offer "low cost" and "high quality" at a much lower cost than hardware solutions, allowing users to connect from any device to the same meeting.

To accomplish this, the software needs to ensure that each participant enjoys the best possible quality based on the capabilities available to the participants, such as the hardware devices in use and/or the type and quality of the network link.

SUMMARY

Aspects of the present invention relate to methods and systems to maximize the quality perceived by the user in a software-based, multi-point video conference or collaboration session between devices that are potentially different (e.g., devices from different vendors, devices with different operating systems, devices on different networks, devices that function as servers, clients or both) and maintain the quality over time.

The methods and systems may, for example, determine an optimal initial configuration for each device involved in the videoconference based on the session parameters, hardware characteristics of the devices and the characteristics of the network used. During the videoconference, a videoconferencing platform may modify the initial configuration to adapt to changes that may occur related to the performance of the session, such as the arrival of a new participant, enabling sharing of documents, and/or changes in network bandwidth and/or modification of the hardware configuration of the device used, such as the addition/removal of "plug and play" devices. The changes mentioned are only for illustrative purposes and do not cover the entire range of changes that may happen during the course of a videoconference. It is well known to those skilled in this field that there are numerous factors that may impact the perceived quality of the interaction, most of them beyond the control of videoconferencing application software.

The changes may include, for example, bit rate and/or settings for capturing video (frame rate/frame size/color space/device) in the transmissions and/or changing the type of streams received. These changes may affect one or more devices involved in the videoconference, as the devices may be treated by the platform as independent, with their own characteristics, and the interaction of multiple devices may not be treated as a single call with a uniform application of settings across devices.

Additional advantages and novel features relating to aspects of the present invention will be set forth in part in the description that follows, and in part will become more apparent to those skilled in the art upon examination of the following or upon learning by practice thereof.

DETAILED DESCRIPTION

Aspects of the present invention relate to methods and systems for maximizing the quality perceived by the user and maintaining quality at the best possible level for most of the duration of a multipoint videoconference and/or other information exchange conducted among different devices (e.g., computers, tablets, smart phones, wearable streaming devices, remote monitoring stations). Devices may include, for example, any electronic suitable device capable of executing a software program, whether a mobile device or not, capable of capturing/playing video and audio content as well as displaying shared desktops. Devices may function as servers, clients or both at the same time. In addition, the term computer or computer system used throughout the document may refer to a computing device that can be turned into a "video device," for example, a computing device that has hardware capabilities to encode audio and video locally and decode/play back audio and videos received from remote locations. Throughout this document, references are made to "videoconference(s)"; however, videoconference(s) should be interpreted to include a wider variety of collaboration including, but not limited to, file sharing, desktop sharing and mark-up, shared whiteboard, text chat, audio and video conferencing.

The methods and systems may determine an optimal initial configuration for each device involved in the videoconference, for example, based on the session parameters, hardware characteristics of the devices, and the characteristics of the network used. During the videoconference, a videoconferencing platform may modify the initial configuration to adapt to changes that may occur, related to the performance of the session, such as the entrance of a new participant, sharing of documents, and/or changes in network bandwidth and/or modification of the hardware configuration of the device used, such as, for example, the addition/removal of plug-n-play devices.

The changes to session parameters may include bit rate and/or settings for capturing video ahead of transmission and/or changing the type of streams received. These changes may affect one or more devices involved in the videoconference, as the devices may be independent from each other and with their own characteristics.

By having the flexibility to allow participants to connect to a video conference from a variety of platforms and/or devices, participants may join the video conference from any location and/or at any time. Moreover, with the ability to connect to the video conference from a mobile device, participants have the ability to take the video conference with them as the participant moves and/or changes locations.

The described aspects may provide participants with a high quality, high-definition (HD) video and audio conferencing, chat functionality, and application sharing, for example. The video conferencing system may allow participants to collaborate through application sharing, desktop sharing, testing and/or polling, file transfers, integrated whiteboards, document sharing and/or integrated flip charts. For example, participants may collaborate by contributing to a document displayed concurrently with the video conference by providing edits, comments, and/or images to the same document. In addition, the video conferencing system may allow participants to chat (e.g., transmit messages to each other) concurrently with the video conference occurring. Participants may have side conversations with each other using the chat function without disrupting the current speaker on the call and/or having other participants on the call view the side conversation.

The described aspects may also allow participants to record the video conference so that participants who are unable to attend the video conference may view the video conference at a later time. In addition, the described aspects may allow participants to be added to the video conference with ease, for example, by sending an e-mail to the participant with a link to the video conference.

The described aspects may use the below discussed session protocol in transmitting the streaming data packets for the video conferencing system and managing the transport of audio, video, and application sharing data. These data packets may have a size ranging from a few tens of bytes to one hundred kilobytes. In addition, the session protocol may optimize data transmission over land and satellite (high latency, frequent packet loss) networks.

Figure 8:
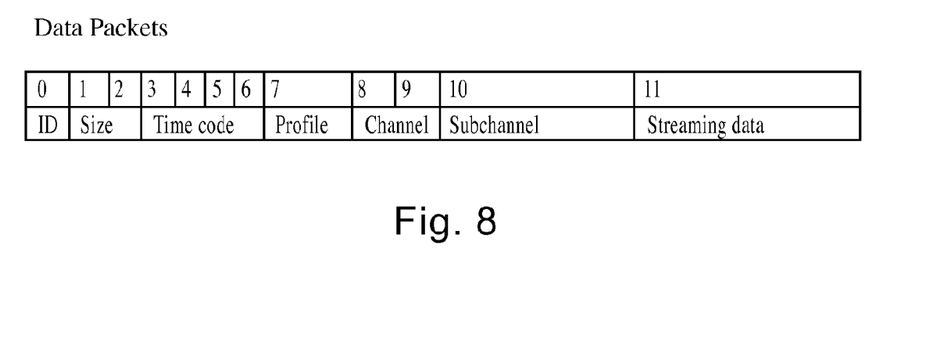
FIG. 8 illustrates an example data packet in accordance with an aspect of the present invention.

FIG. 8 illustrates an example data packet transmission in accordance with an aspect of the present invention where: ID is one BYTE (8-bit unsigned integer) defining the type of streaming packet being transported (i.e., audio, video, app sharing, or control), Size is a WORD (16-bit Unsigned Integer) indicating the overall size (in bytes) of the streaming packet, Time code is a DWORD (32-bit Unsigned Integer) providing the time stamp associated with the packet, Profile is a BYTE identifying the profile used for the encoding of streaming data, Channel is a WORD identifying the data channel associated to the streaming coming from a specific participant, Subchannel is a BYTE identifying a specific version of data streaming on the given channel, and Streaming data are the real streaming data (audio samples, video frames, etc.).

By inserting the WORD channel into the session protocol for transmitting the streaming data, different versions of the same content may be inserted into the streaming data and/or may be associated to a specific data stream. For example, various streaming data from the same source may be available for the video conference, such as low, medium, and/or high quality streams. The subchannel field may allow the video conferencing system to recognize the different versions of the same content identified by the channel field (e.g., low, medium, and/or high quality streams). In addition, the streaming data may have contemporaneous translations of the audio corresponding to the video (e.g., an audio stream with the original voice data and/or different audio streams for each translator). The subchannel may identify the audio stream of each translator so a participant may select the audio stream in his/her preferred language.

In an aspect, participants in the video conference may have the option to select the best possible audio and video streaming data based upon, for example, a preferred language, processing power of a device and/or available bandwidth for the video conference. For example, the participant may use the subchannel to select the best possible audio and video stream for the video conference.

In another aspect, the device the participant is using to connect to the video conference may automatically select the best subchannel to stream the video conference, given parameters applicable to the device (e.g., processing power, available bandwidth, default language). For example, if the participant is using a mobile device in an area of coverage with a lower amount of available bandwidth, the mobile device may automatically select a lower quality subchannel of the video conference to stream. However, if the participant moves to an area of coverage with a higher area of coverage and/or more bandwidth available, the mobile device may automatically switch to a higher quality subchannel of the video conference to stream.

Another aspect may include threshold driven streaming. For example, the video conferencing system may adjust the streaming parameters automatically and/or dynamically when one or more parameters that influence quality of the video conference exceed a threshold value. An alert, such as a notification message, changing color and/or fonts on a display, and/or an audio signal (e.g., a beep, an alarm, a voice notification) may be generated and sent when one or more parameters (e.g., Round Trip Time (RTT), Jitter, Packet loss, central processing unit (CPU) usage) exceed a threshold value that defines a minimum acceptable quality. For example, an alert may be generated notifying the video conferencing system that the jitter exceeds the jitter threshold value. Upon receiving an alert, the video conferencing system may adjust the one or more parameters that exceed the threshold value, accordingly, by changing, for example, the subchannel of the streaming data and/or modifying the upload transmission.

For example, if the upload bandwidth is suddenly reduced and the RTT exceeds a RTT threshold value, an alert may be generated notifying the video conferencing system that the RTT threshold value has been exceeded. Upon receiving the alert, the video conferencing system may change one or more parameters affecting the upload bandwidth, such as frame size, frame rate, or other encoder settings) to reduce the bandwidth usage. By reducing the bandwidth usage, the session may continue with a reduced but acceptable quality (e.g., without interruptions). When the alert stops (e.g., the bandwidth is increased and the RTT moves below the RTT threshold value), the video conferencing system may reset the parameters to the original values and return the video conference quality back to the original level.

Figure 9:
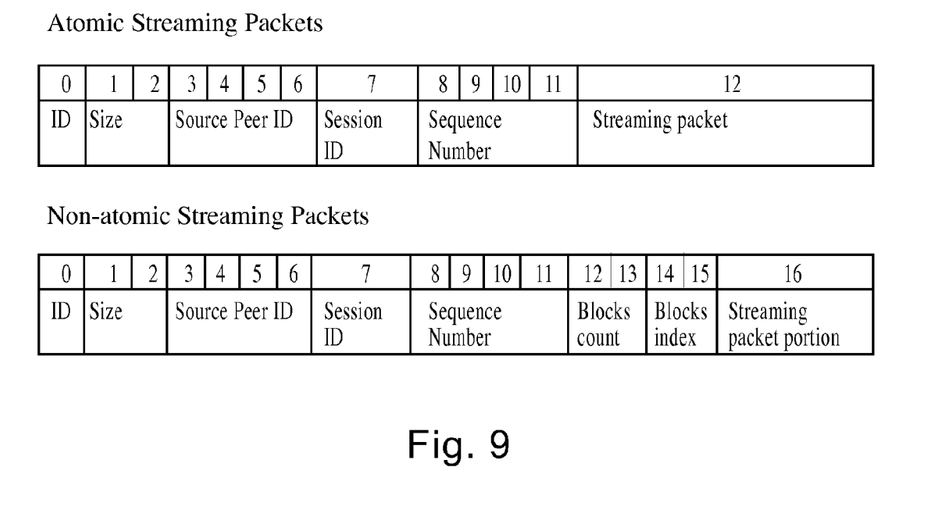
FIG. 9 illustrates example atomic streaming packets and non-atomic streaming packets in accordance with an aspect of the present invention.

In an aspect, the transport of streaming data may be carried out by using atomic streaming packets (whose size does not exceed a network threshold value), as well as by using non-atomic streaming packets (whose size does exceed the network threshold value). These packets may have a size ranging from a few tens of bytes to one hundred kilobytes. To optimize the data transmission, the size of each packet may be set so as not to exceed a certain network value (e.g., about one thousand bytes). The transport of streaming data may be carried out, for example, according to the structure illustrated in FIG. 9, where ID is a BYTE that defines the type of packet being transported (atomic/non-atomic), Size is a WORD that defines the overall size (in bytes) of the packet being sent, Source Peer ID is a DWORD including the sender ID, Session ID is a BYTE defining the session associated to the stream, Sequence number is a DWORD indicating the progressive number of the packet within a broadcast sequence, Blocks count is WORD indicating how many packets are necessary to reconstruct the entire streaming packet, Block index is a WORD indicating the position of the packet within the packet sequence of which the packet forms part, and Streaming packet portion is either the full packet or a portion in the case of non-atomic streaming packets.

By using atomic and non-atomic packets and socket buffering, for example, the quality of the video conference may be increased when the download bandwidth is constrained and/or the upload bandwidth is suddenly reduced.

In another aspect, the video conferencing system may allow asynchronous data exchange to occur that is enabled by a proprietary library placed on the operating system platform. The asynchronous data exchange enabled by such library may free the application layer from issues caused by Transmission Control Protocol (TCP) (e.g., delays in data transmission due to management and recovery of data packets lost over the network) that makes the use of TCP in real time communications inferior to User Datagram Protocol (UDP) (the standard transport protocol of software and hardware based videoconferencing). Thus, by using the library for asynchronous data exchange, the video conferencing system may maintain the advantages of using TCP, such as automatic packet recovery and "built-in" firewall and proxy traversal without the pitfalls of TCP (e.g., delays in data transmission due to management and recovery of data packets lost over the network).

Figure 1:
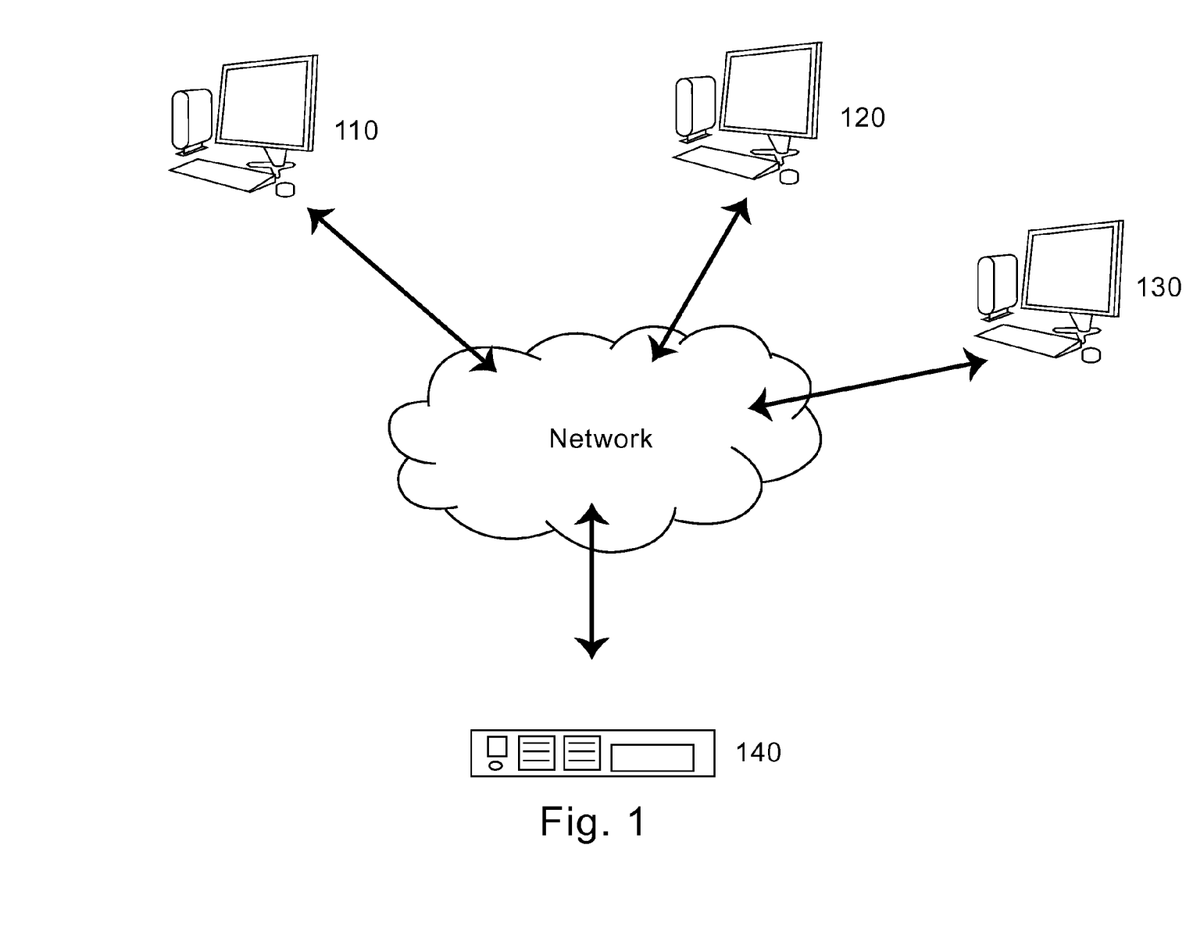
FIG. 1 illustrates videoconferencing communication devices connected to the video server in accordance with an aspect of the present invention.

In the system architecture, described in FIG. 1, each video conferencing workstation (device) is connected to the server via a videoconference network (wired, wireless or mobile— for example, but not only, 3G, 4G, WiMAX).

Figure 2:
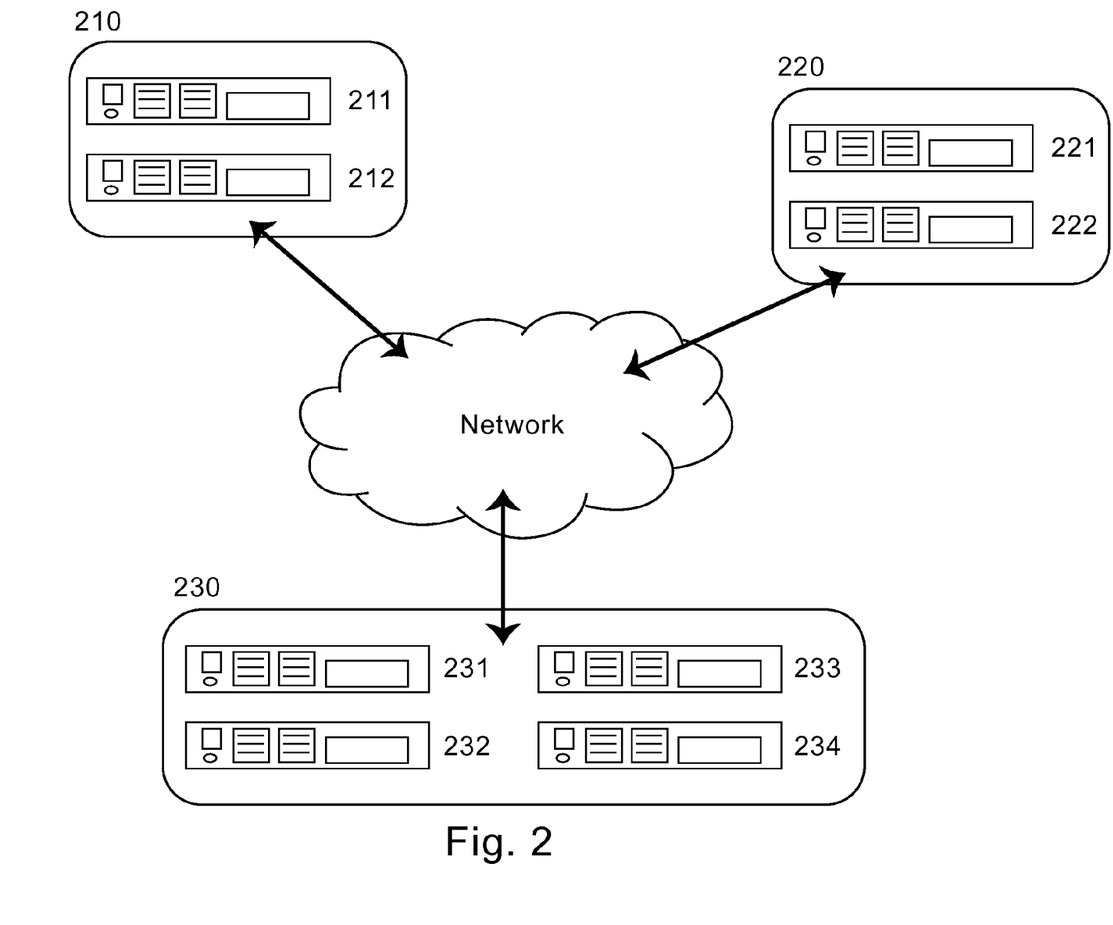
FIG. 2 illustrates general architecture of the server videoconferencing in accordance with an aspect of the present invention.

The term "videoconferencing server," as shown in FIG. 2, is not limited to a single server accessible by the devices, but may be extended to a cluster comprising one or more groups of servers (210, 220, 230) geographically dispersed and interconnected through high speed connections, where each group of servers includes one or more servers (211, 212, 221, 222, 231, 232, 233, 234) over a local network with load-balancing among them. In an aspect, the servers may be or include one or more relay servers.

Servers may include, for example, any physical electronic device (e.g., rack-mounted personal computer (PC), blade PC, desktop PC, laptop PC, mobile device) or virtual machine that can run the videoconferencing management platform and participate in a videoconferencing session. Any server can function both as server and device at the same time.

In an aspect, the load-balancing and fault tolerance among servers may be managed directly by the videoconferencing management platform through active communications among servers. For example, each server may know the state and the workload of the other servers, and may determine which server has the lowest workload and which server(s) may have an error (e.g., the server is not functioning properly).

This approach may provide cost savings, as there may be no need or reduced need to use a dedicated load-balancing cluster or external systems, including costs being further lowered when using virtual machines.

One or more video devices may connect to the server with the lowest workload within each group of relay servers. In an aspect, the group of relay servers to connect to may be determined based on the lowest latency of interconnection with a server and not necessarily the nearest physical/geographical connection to a server.

Figure 3:
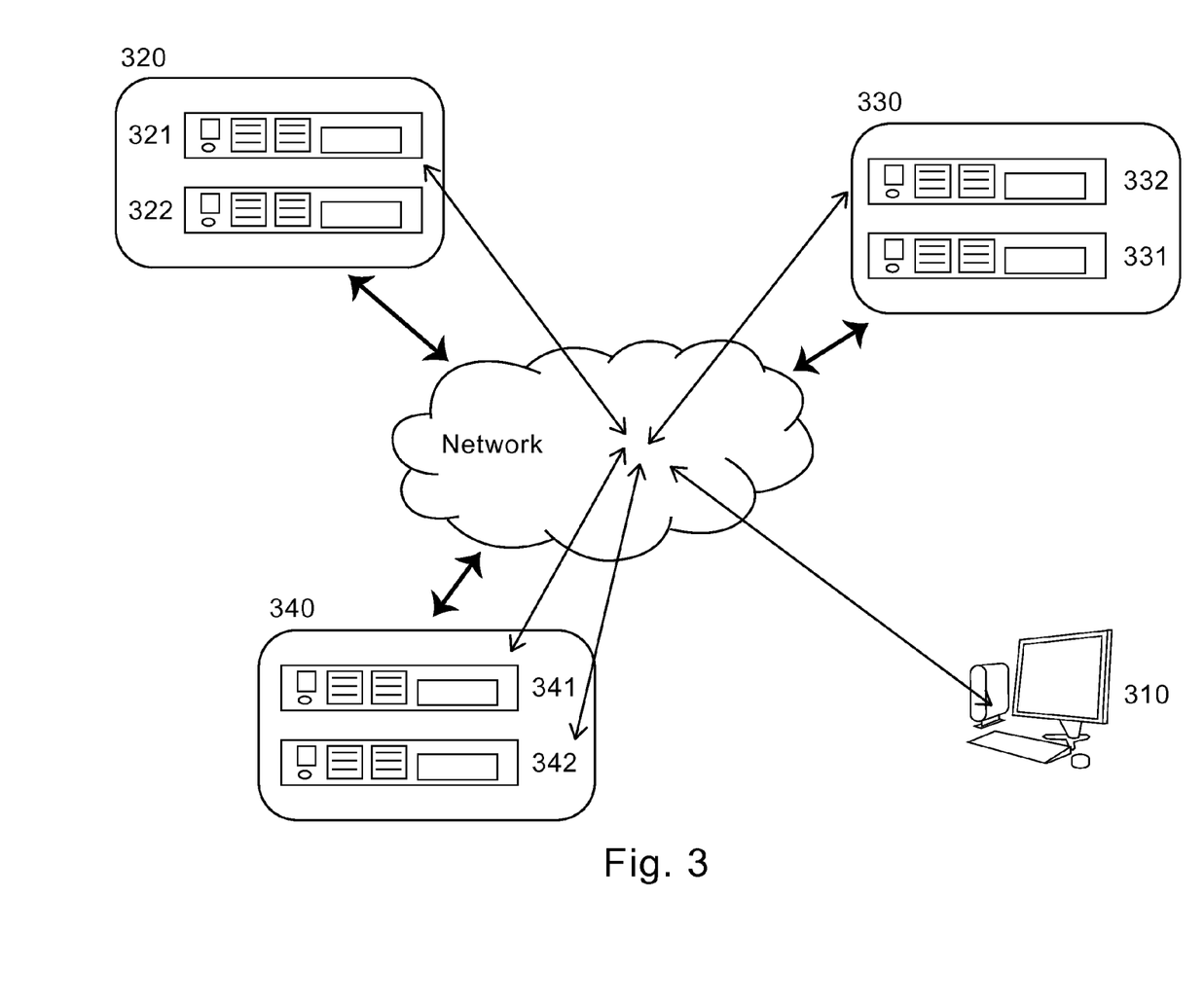
FIG. 3 illustrates a process of connecting a device to the server in accordance with an aspect of the present invention.

FIG. 3 illustrates a process that leads to connecting a device 310 with server 332. Device 310 may connect to any suitable server in a list of available servers (i.e., 321, 322, 331, 332, 341, or 342), receiving in response a list format including one active server for each group of relay servers (i.e., 320, 330, and 340). Device 310 may perform a latency test with each of the servers 321, 331, and 341, which may result in identifying, for example, the group of relay servers guaranteeing the minimum latency value. For example, the group of relay servers 340 may guarantee the minimum latency value and device 310 may connect with sever 341. In an aspect, server 341 may redirect device 310 to another server within the group of relay servers based on a determination of which server has the lowest workload in the group of relay servers. For example, server 341 may determine that server 342 has the lowest workload of each of the servers within the group of relay servers 340 and server 341 may redirect device 310 to server 342 based on the determination.

Each device may be placed behind a firewall and/or proxy without affecting the ability to conduct video conferences with other users, wherever they are. The traversal of firewalls and/or proxies and/or Network Address Translations (NATs) may occur without requiring any re-configuration, as data flows are made to pass through open Hypertext Transfer Protocol (HTTP)/Hypertext Transfer Protocol Secure (HTTPS) ports, and TCP/Internet Protocol (IP) is used for data transport.

Since TCP/IP was created to ensure lossless transmission of data, to avoid possible delays introduced by the retransmission of lost packets, aspects may include a multi-platform library that implements asynchronous TCP/IP sockets, whereby data transmission is not blocked waiting for any retransmission in order to ensure a low latency and thus maintains the synchronous reception of audio and video. In addition, these sockets may allow the streaming of such data to be less affected by fluctuations of the available upload bandwidth. A further optimization of data transmission may include sending packets with a maximum size no larger than a thousand bytes, for example, as packets that are larger may be fragmented into smaller ones and then reassembled at reception. This approach allows interspersed flows linked to the different channels (e.g., audio, video, data) to be transmitted in an optimized fashion using a single socket between each device and server.

If the network allows it, data may also be sent alternatively via UDP UNICAST or MULTICAST, and UNICAST and MULTICAST streams may be used in the same video-conferencing session. The system may detect, for each device, for example, which type of protocol to use based on the type of network between each device and server. The system may also support streaming of data via satellite networks.

One or more or each device may include a physical device (e.g., desktop PC, laptop PC, tablet, smart phone) able to run the conferencing platform (the program), directly or through devices to capture and play back audio (e.g., microphones and speakers, headset or Universal Serial Bus (USB) analog, external speakers, microphones, table microphones), as well as devices to capture video (e.g., integrated cameras, webcams, external HD or standard definition (SD) analog cameras combined with video capture cards, network cameras), or devices to view or render the videos and collaborative features (e.g., integrated monitor, one or more external monitors, projectors, high-definition television (HDTVs)).

It is obvious to those skilled in the field of audio/video that it is not possible to list all the possible solutions that the market offers to encode an audio/video signal, or to reproduce such signals from a computing device. Any suitable device that is able to encode an audio/video signal and decode the audio/video signal(s) received may be used for a video conferencing device.

This approach allows both a low-cost device for a single user and a high definition device for a conference room, to both be managed by the same program, for example.

Figure 4:
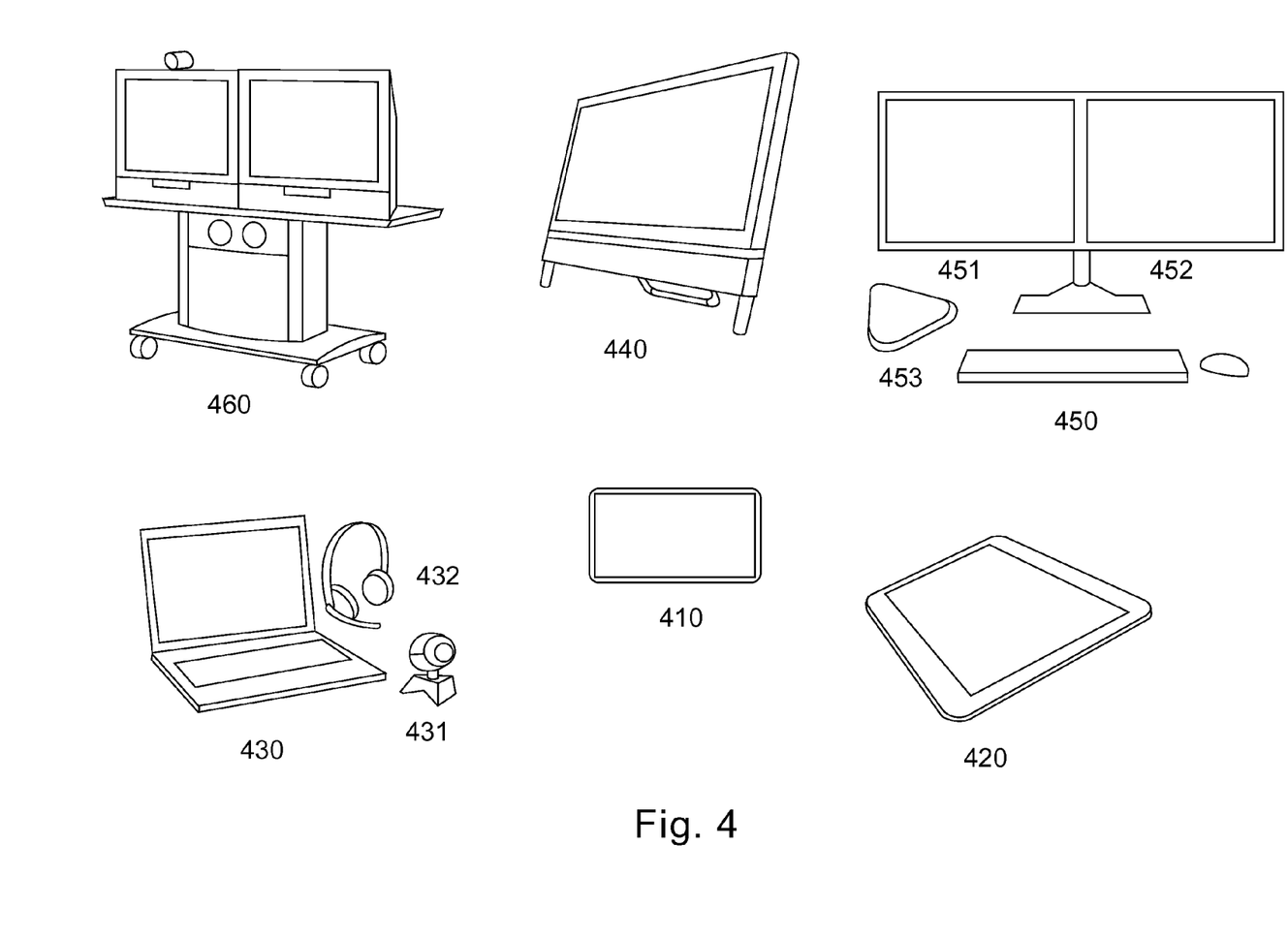
FIG. 4 illustrates examples of videoconferencing devices in accordance with an aspect of the present invention.

FIG. 4 illustrates some examples of devices usable in accordance with aspects of the present invention (410—smartphone, 420—tablet, 430—laptop with 431—webcam and 432—headset, 440—all-in-one PC, 450—desktop PC with dual monitors 451 and 452 and desktop microphone—453, meeting room system—460).

Each user may initiate a videoconference from his/her device, inviting one or more users contemporaneously, even when such devices have very different characteristics. For example, some devices may have high quality and other devices may have low quality.

Figure 5:
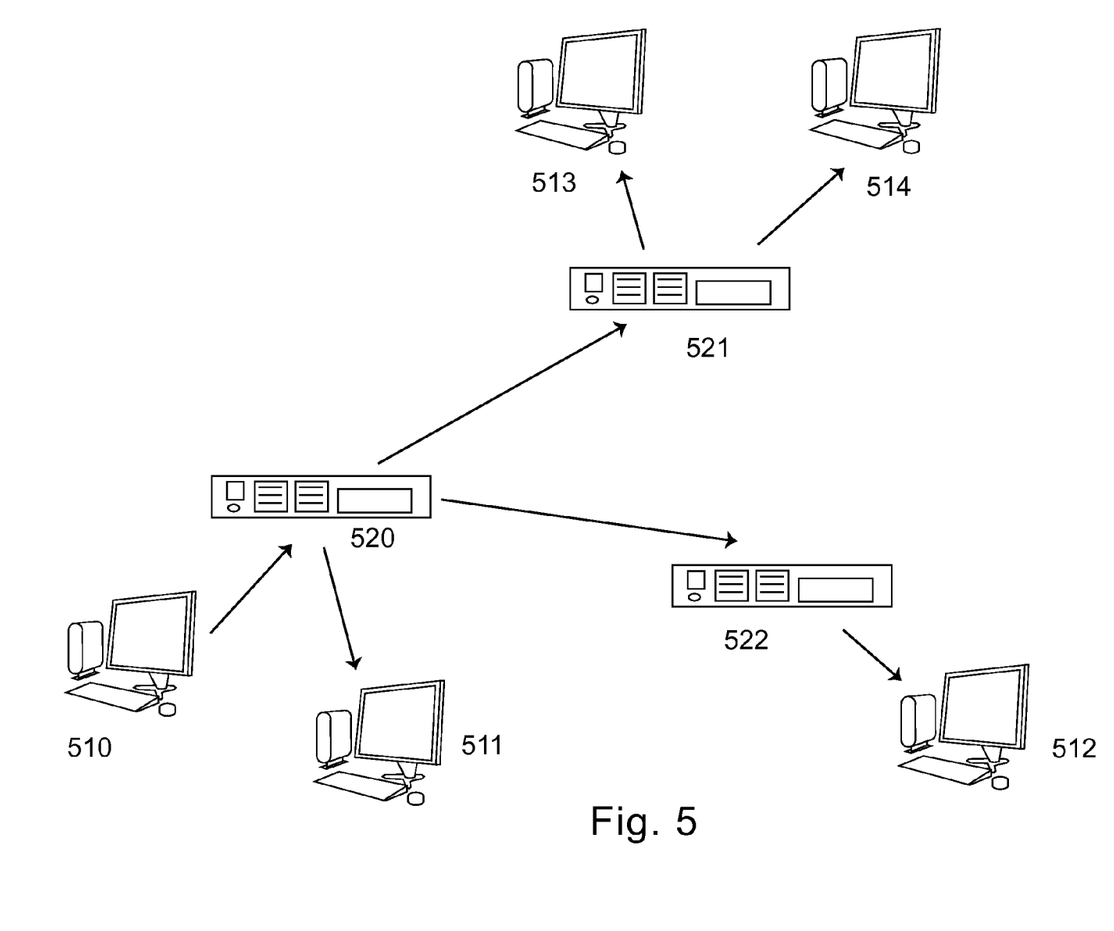
FIG. 5 illustrates an example data flow between a device and all other devices participating to the same video conferencing session in accordance with an aspect.

During a videoconference, each device may send to the server an audio/video stream and, if collaboration is active, a data stream as well. FIG. 5 illustrates the flow of data from a specific device 510 to the other devices in a videoconference. For example, server 520 may retransmit the received data signal from device 510 to each of the servers (e.g., 521, 522) to which at least one of the devices participating in the same session is connected (e.g., 511, 512, 513, 514) and each server 520, 521, 522 may then send the data signal to the participating devices (e.g., 511, 512, 513, 514) connected to the server (e.g., 520, 521, 522).

It is noted that the servers do not carry out any transcoding on the data flow, as typically happens in Multipoint Control Units (MCUs), the central communication hubs in traditional video conferencing systems, but may, for example, redirect traffic to participating devices.

An advantage may include considerable containment of the costs of the server, as it may not be necessary to have arrangements that include adequate computing power for decoding each received video signal input, the composition of a new video signal for each recipient being given by the union of the video signals of the other participants, and the encoding of the new video signal for transmission to the recipient. This approach may reduce the cost of each server's hardware, for example, as transcoding requires significant hardware resources.

In addition, another advantage may include minimizing the costs associated with band interconnection among servers because each signal may, for example, be sent only once to each server, regardless of how many devices are connected to each server for the same videoconference. Each device may receive from the server, in an independent manner, the various data streams from other participating devices.

Each stream may be identified at the level of network protocol, with a value pair of channel/sub-channel for each device with an audio channel, a video channel, and a data channel for collaboration. Each channel may be further divided into sub-channels that identify different versions of the same content. For example, an audio channel may be provided in the original language, such as English and a series of sub-channels of audio may be translated into different languages, such as Spanish, French, German, and Chinese. In addition, the video may have sub-channels characterized by different quality. These are just examples of the possible uses of the channel/sub-channel pair and are not exhaustive.

Thanks to the use of the channel/sub-channel pair, one or more or each device may have the ability to select among all the flows that the server has available to transmit, a portion of the flows to be transmitted, thereby saving download bandwidth.

The initial characteristics of the videoconference (e.g., an overall quality), may be selected by the user (host) who creates the meeting and may depend, in addition to the capabilities of his/her device, on the bandwidth that is allocated to the session. For example, the greater the allocable bandwidth, the higher the quality that may be obtainable for each device.

Each participating device involved in the videoconference may be queried to ensure as much as possible that the required quality is maintained, and that the program runs an initial verification of the characteristics of each device to determine any changes to be made.

Specifically, for example, it may be determined whether or not the required bandwidth is available for the given device, and then, on the basis of the bandwidth actually being used (which may be less than or equal to that required), the best possible combination of frame size/frame rate (among those supported by the camera of the device) may be determined and used to encode video.

Figure 6:
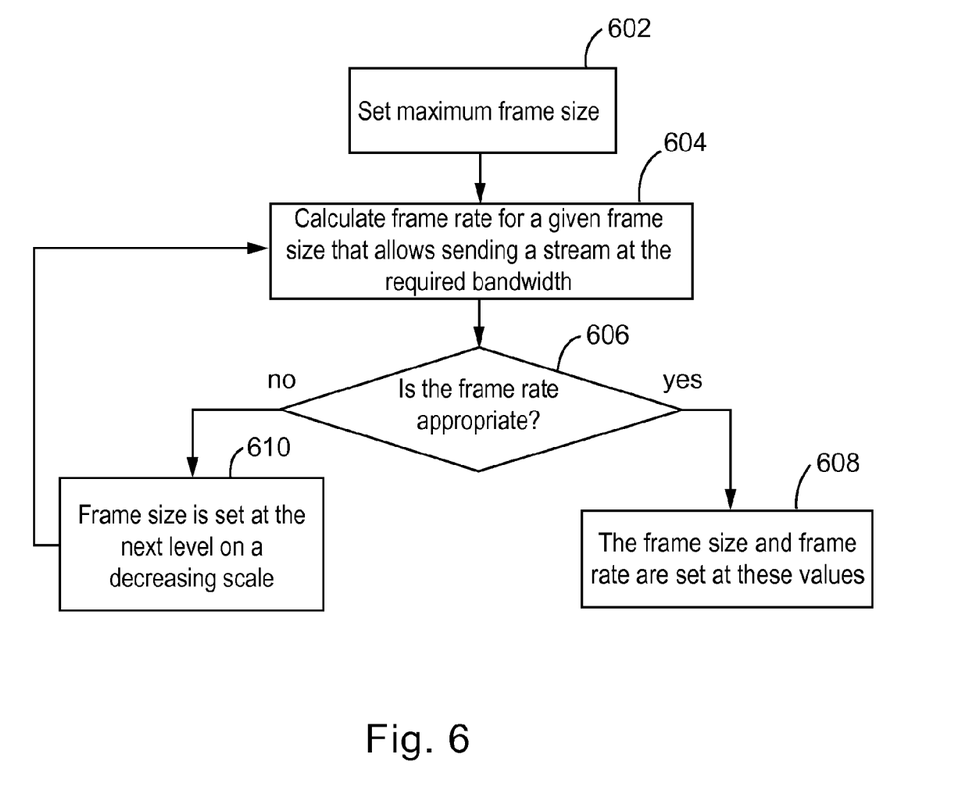
FIG. 6 illustrates an example method flow of determining a best frame size/frame rate combination for video encoding on a device in accordance with an aspect of the present invention.

FIG. 6 illustrates an example method flow in accordance with an aspect of the present invention. The method may include setting a maximum frame size for the video capturing device 602. For example, the system may determine a maximum frame size for the video capturing device and set the frame size. The choice of the best combination of frame size/frame rate may be a key factor in the video quality. Frame size (i.e., the size—or resolution—of every single video frame), and frame rate (i.e., how many video frames are created in a given time—the greater this number, the higher the fluidity of the video) may be key determinants of the output bit rate (i.e., the bandwidth used) by each device. Below a certain frame rate, the video may lose fluidity, and a lower resolution but a greater fluidity of movement may be preferable. The method may also include calculating a frame rate for a given frame size that allows transmission of a stream at a required bandwidth 604. For example, the system may determine the best resolution offered by the video capturing device (e.g., camcorder and capture card, webcam, network cam) and may determine the best frame rate possible given the bandwidth set for the meeting.

The method may include determining whether the frame rate is appropriate 606. If such a frame rate is greater than the minimum acceptable value, the method may include setting the frame size and frame rate to the determined values 608, and the process may end. If the frame rate is lower than the minimum acceptable value, the method may include setting a lower resolution and re-evaluating the frame rate used 610. In an aspect, the system may set the frame size at the next level on a decreasing scale.

The process may be continuously repeated until any of the following two conditions are met, for example: the process has set an appropriate frame rate, and none of the resolutions supported by the video capturing device meets the bandwidth limitation with adequate fluidity. In this case, the process uses the minimum resolution offered by the camera, with the lowest possible frame rate value.

Figure 7:
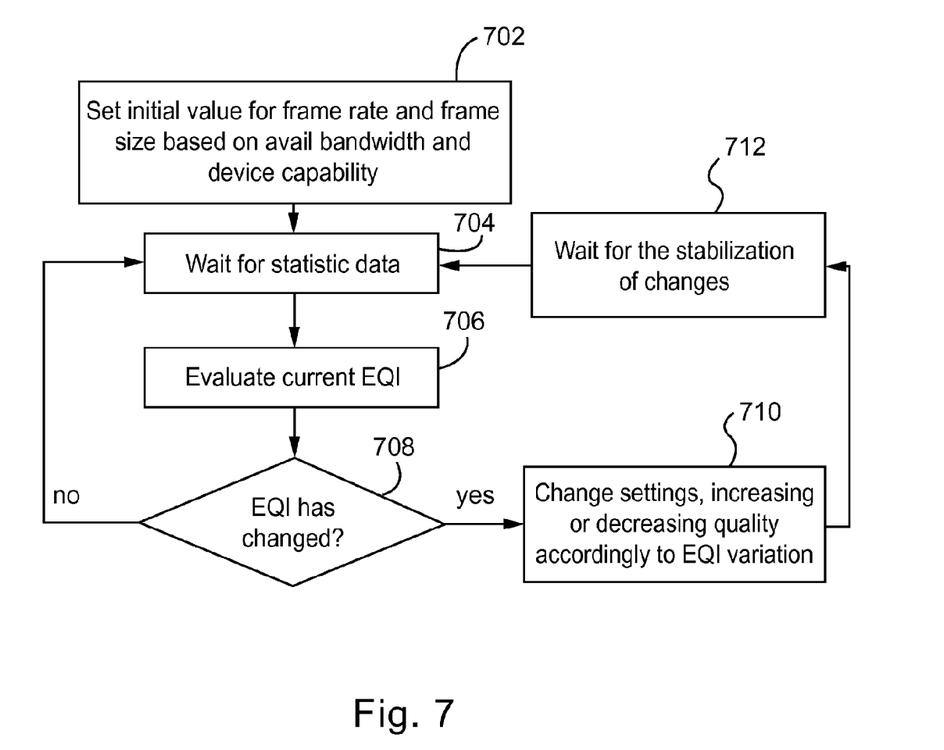
FIG. 7 illustrates an example method flow for determining the equivalent quality index (EQI) in accordance with an aspect of the present invention.

FIG. 7 illustrates a method flow for determining the equivalent quality index (EQI) in accordance with an aspect of the present invention. The method may include setting an initial value for frame rate and frame size based on available bandwidth and device capability 702. Once the initial parameters have been identified, the program may set the parameters and connect the device to the videoconferencing session. As shown in FIG. 7, during the session, the program may continuously monitor a variety of parameters relating to the device, as well as the performance of the overall videoconferencing session. These parameters are summarized in an "equivalent quality index" (EQI) that each device transmits to the program resident on the host device.

The method may include waiting for statistical data 704 and evaluating a current EQI 706. In an aspect, statistical data may include the parameters taken into consideration for the EQI, for example. The parameters taken into consideration may include (where applicable): overall CPU consumption; kernel CPU consumption; CPU consumption by the program; packet loss; audio jitter; video jitter; RTT to and from the server; upload bandwidth; and download bandwidth. These parameters may be device-specific values linked to a single device, or vectors, associated with the interaction of each device with the others participating in the videoconferencing session.

In particular, device-specific values may include CPU consumption, RTT, and bandwidth; vectors may include Packet Loss and jitter, since each device keeps track of packet loss, and audio/video jitter with all other devices participating in the session, for example.

The method may include determining whether the EQI has changed 708 and changing settings according to the EQI variation 710. In an aspect, the changes to the settings may include increasing or decreasing quality according to the EQI variation. For example, based on the EQI, each device may change its parameters to improve performance whenever necessary. In addition, the host device (which has a global view of the session's perceived quality) may change the general parameters of the videoconference, to which each participating device will immediately adapt.

The areas of intervention on which the program acts to control EQI may depend on which factor is causing a decline of the EQI. Such factors may include drop in upload bandwidth, for example. As several sub-channels may be sent by each device, for example, the first option in case of limited upload bandwidth may be to change the quality of each sub-channel sent.

Changes in video capturing settings may have an impact both on the upload bandwidth used, and on the consumption of device resources, as both may increase when frame rate and frame size go up. Given the heterogeneity of devices and networks, there may be cases where bandwidth does not impose any limit while the device's computing power does, or vice versa.

In particular, for example, when the available upload bandwidth declines for several seconds without recovering (for sporadic or temporary dips of short duration, even if significant in terms of amplitude, the mechanism of the asynchronous TCP socket allows the system to minimize the EQI's decline), the program may lower frame size and/or frame rate to stay within the changed bandwidth limits.

If the bandwidth reduction is drastic, the transmission of all video sub-channels may, for example, also be suspended and replaced by a static image of the user. Similarly, if the CPU consumption linked to the video encoding process is high, the program may lower frame size and/or frame rate.

The reduction of the frame size obviously may result in a degradation of the video quality received from all devices except the one sending it, causing a degradation of the overall quality of the session perceived by all participants. However, the reduction is likely to be minimal and is still preferable to an interruption of the videoconferencing session itself, provided the EQI is kept at acceptable levels. A reduction of the frame rate may be more difficult to perceive by users, given the static nature of many meetings.

In case of problems in download bandwidth, the device may switch from the highest quality sub-channel (the default option) to lower quality ones, or, for example, suspend video reception and replace the video reception with a static image.

Deselection of one or more video streams received, or switching from a video stream of high quality to that of a low quality, may be made possible by registering on the server which channels/sub channels for which the device is set or selected to receive. For example, when high-definition videoconferencing occurs between communication devices, even with adequate bandwidth, to which a device with low bandwidth is added. The low bandwidth device may tune to a low resolution sub-channel and still be able to participate without affecting the quality of other participants.

Of course, the quality of the audio-video received by the low bandwidth device may be lower than the quality of high definition devices, but these two "worlds" may be able to communicate at the best of their abilities.

Overall reduction of bandwidth for use in videoconferencing may be controlled by the host device, which may intervene when the host device determines or otherwise senses or receives information that, in general, there are quality problems related to the band used. For example, when the host device finds that the EQIs sent by several devices signal a widespread quality problem due to network congestion, the host may reduce the overall bandwidth of the meeting by sending a command to all other devices in the videoconferencing session. For some devices, this may lead to a change in the video encoding parameters.

The EQI monitoring may be continuous during each videoconferencing session. The method may further include waiting for the stabilization of changes to any parameter 712. For example, when the system changes any parameter on the basis of an unsatisfactory EQI, there may be a non-responsive period, during which further EQI signals are ignored in order to assess the impact of the changed parameters on EQI(s). If changes have not been made to the EQI, the method may return to 704 and wait for statistic data.

One variation of the described aspects may include monitoring EQI during other forms of communications, such as, but not limited to, cell phone calls, television over IP broadband, IP network control, and using the described aspects to maintain a level of quality assurance during the communications.

Figure 10:
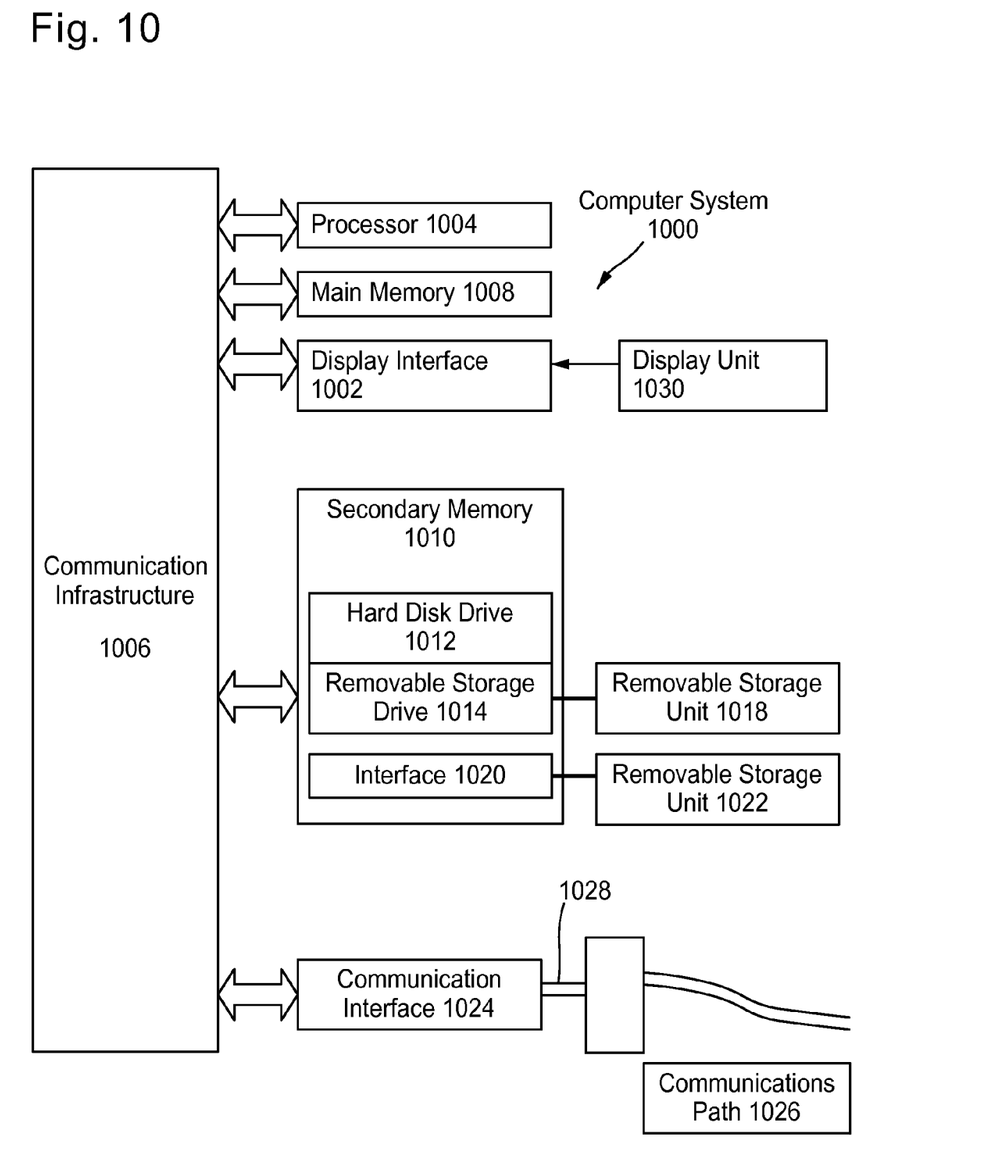
FIG. 10 illustrates various features of an example computer system for use in conjunction with aspects of the present invention.

Aspects of the present invention may be implemented using hardware, software, or a combination thereof and may be implemented in one or more computing systems or other processing systems. In an aspect of the present invention, features are directed toward one or more computing systems capable of carrying out the functionality described herein. An example of such a computer system 1000 is shown in FIG. 10.

Computer system 1000 includes one or more processors, such as processor 1004. The processor 1004 is connected to a communication infrastructure 1006 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 1000 can include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., which is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1014, a hard disk installed in hard disk drive 1012, and signals 1028. These computer program products provide software to the computer system 1000. Aspects of the invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention that is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, features thereof is implemented using a combination of both hardware and software.

Figure 11:
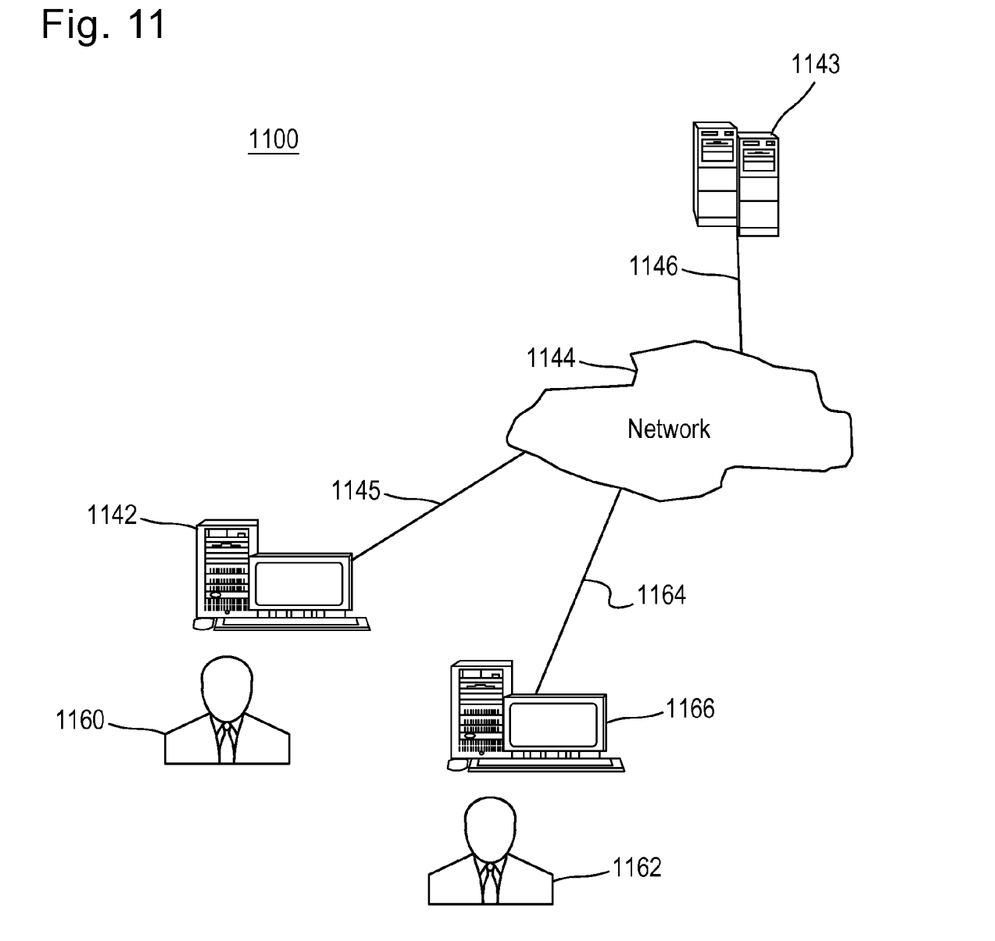
FIG. 11 illustrates an exemplary system diagram of various hardware components and other features for use in accordance with aspects of the present invention.

FIG. 11 shows a communication system 1100 usable in accordance with aspects of the present invention. The communication system 1100 includes one or more accessors 1160, 1162 (also referred to interchangeably herein as one or more "users") and one or more terminals 1142, 1168. In one aspect of the present invention, data for use is, for example, input and/or accessed by accessors 1160, 1162 via terminals 1142, 1168, such as personal computers (PCs), minicomputers, mainframe computers, microcomputers, telephonic devices, or wireless devices, such as personal digital assistants ("PDAs") or a hand-held wireless devices coupled to a server 1143, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. The couplings 1145, 1146, 1164 include, for example, wired, wireless, or fiberoptic links.

While aspects of the present invention have been described in connection with examples thereof, it will be understood by those skilled in the art that variations and modifications of the aspects of the present invention described above may be made without departing from the scope hereof. Other aspects will be apparent to those skilled in the art from a consideration of the specification or from a practice in accordance with aspects of the invention disclosed herein.

The invention claimed is:

1. A method of establishing and managing videoconferencing and collaboration sessions in a videoconference call among heterogeneous communication devices to maximize a perceived quality of each of the communication devices independently, comprising:
    establishing the videoconference call for a plurality of communication devices, based upon device capabilities for each of the plurality of communication devices, each communication device communicating with at least one server selected from a plurality of servers, wherein the at least one server is selected based on the lowest latency;
    receiving, from a first data communication device of the plurality of communication devices, a data stream comprising a plurality of channels and sub channels for different versions of the data, including a high definition resolution data channel and a series of lower quality data channels;
    transmitting the received data stream to the other of the plurality of communication devices, wherein each of the other communication devices selects a channel of the data stream for receipt of the data stream to optimize an equivalent quality index and a user preference;
    continuously calculating during the videoconference call the equivalent quality index associated with each of the plurality of communication devices in the videoconference call;
    determining for each communication device independently of the plurality of communication devices whether a corrective action is required to reduce a bandwidth usage of the respective communication device based upon the equivalent quality index; and
    performing the corrective action to reduce the bandwidth usage of each communication device independently of the other of the plurality of communication devices upon determining that the corrective action is required, wherein upon performing the corrective action, ignoring subsequent equivalent quality index signals for a preset or determined period of time in order to ascertain an impact of the corrective action on the user experience associated with the data streams received from other of the plurality of communication devices.

2. The method of claim 1, wherein the equivalent quality index is calculated for each communication device of the plurality of communication devices based on computing power, packet loss of each stream received, audio jitter of each audio channel received, video jitter of each video channel received, round trip time from and to a server, upload bandwidth, and download bandwidth.

3. The method of claim 1, further comprising:
    calculating for each of the plurality of communication devices a frame rate for a frame size to transmit the data stream; and
    determining whether the frame rate is at least a minimum acceptable value.

4. The method of claim 3, further comprising:
    decreasing the frame size when the frame rate is lower than the minimum acceptable value.

5. The method of claim 1, further comprising:
    changing the behavior of each communication device independently of the other communication devices.

6. The method of claim 5, wherein changing the behavior comprises changing one or more frame sizes, changing a frame rate video capture, and editing a band used to upload data by changing a bandwidth needed for selecting which channels the server should send to the communication device.

7. A system for establishing and managing videoconferencing and collaboration sessions in a videoconference call among heterogeneous communication devices in the same call to maximize a perceived quality of each of the communication devices independently, comprising:
    a platform operable by a processor to:
    establish the videoconference call for a plurality of communication devices, based upon device capabilities for each of the plurality of communication devices, each communication device communicating with at least one server selected from a plurality of servers, wherein at least one server is selected based on the lowest latency;
    receive, from a first data communication device of the plurality of communication devices, a data stream comprising a plurality of channels and sub channels for different versions of the data, including a high definition resolution data channel and a series of lower quality data channels;
    transmit the received data stream to the other of the plurality of communication devices, wherein each of the other communication devices selects a channel of the data stream for receipt of the data stream to optimize an equivalent quality index and a user preference;
    continuously calculate during the videoconference call the equivalent quality index associated with each of the plurality of communication devices in the videoconference call;
    determine for each communication device independently of the plurality of communication devices whether a corrective action is required to reduce a bandwidth usage of the respective communication device based upon the equivalent quality index; and
    perform the corrective action to reduce the bandwidth usage of each communication device independently of the other of the plurality of communication devices upon determining that the corrective action is required, wherein upon performing the corrective action, ignoring subsequent equivalent quality index signals for a preset or determined period of time in order to ascertain an impact of the corrective action on the user experience associated with the data streams received from other of the plurality of communication devices.

8. The system of claim 7, wherein the equivalent quality index is calculated for each communication device of the plurality of communication devices based on computing power, packet loss of each stream received, audio jitter of each audio channel received, video jitter of each video channel received, round trip time from and to a server, upload bandwidth, and download bandwidth.

9. The system of claim 7, wherein the communication devices include any electronic device with hardware to capture video, render audio, and render video signals.

10. The system of claim 7, wherein the communication devices are coupled by connecting to one or more servers via a local area network (LAN) or wide area network (WAN).

11. The system of claim 7, wherein a given communication device connection to the server uses either Transmission Control Protocol (TCP) or User Datagram Protocol (UDP in either UNICAST or MULTICAST mode).

12. The system of claim 7, further comprising:
a video server that is moved geographically, wherein each communication device is connected to one of the video servers and the interconnection between the servers allows the communication devices to talk.

13. The system of claim 7, wherein a point server receives a single signal from each communication device and propagates the signal to each of the other servers connected to a communication device of the same video conference, while the other servers replicate locally the signal for each communication device of the same video conference connected to the other servers.

14. The system of claim 7, wherein the platform constantly monitors the equivalent quality index of the videoconference on each communication device and maintains the equivalent quality index as high as possible.

15. The system of claim 7, wherein the platform changes the behavior of each communication device independently of the other communication devices.

16. The system of claim 15, wherein changing the behavior comprises one or more devices changing a frame size, changing a video capture frame rate, and editing a band used to upload data by changing a bandwidth needed for selecting which channels the server should send to the communication device.

17. The system of claim 7, wherein the platform uses a platform library to implement asynchronous Transmission Control Protocol (TCP) sockets to compensate for delays that TCP introduces into the data stream when using the TCP protocol.

18. The system of claim 7, wherein the platform identifies each type of data flow of a given communication device with channel specific data, subdividing each channel into sub channels to indicate the presence of different versions of the data in the data flow; and allows the communication device to select which channels to receive from the server and for each channel, which sub-channel, so as to optimize the equivalent quality index.

19. The system of claim 18, wherein the channel specific data is one of channel audio, video channel, and channel collaboration.

20. A non-transitory computer-readable medium storing computer executable code, comprising:
at least one instruction for causing a computer to establish a videoconference call for a plurality of communication devices, based upon device capabilities for each of the plurality of communication devices, each communication device communicating with at least one server selected from a plurality of servers, wherein at least one server is selected based on the lowest latency;
at least one instruction for causing the computer to receive, from a first data communication device of the plurality of communication devices, a data stream comprising a plurality of channels and sub channels for different versions of the data, including a high definition resolution data channel and a series of lower quality data channels;
at least one instruction for causing the computer to transmit the received data stream to the other of the plurality of communication devices, wherein each of the other communication devices selects a channel of the data stream for receipt of the data stream to optimize an equivalent quality index and a user preference;
at least one instruction for causing the computer to continuously calculate during the videoconference call the equivalent quality index associated with each of the plurality of communication devices in the videoconference call;
at least one instruction for causing the computer to determine for each communication device independently of the plurality of communication devices whether a corrective action is required to reduce a bandwidth usage of the respective communication device based upon the equivalent quality index; and
at least one instruction for causing the computer to perform the corrective action to reduce the bandwidth usage of each communication device independently of the other of the plurality of communication devices upon determining that the corrective action is required, wherein upon performing the corrective action, ignoring subsequent equivalent quality index signals for a preset or determined period of time in order to ascertain an impact of the corrective action on the user experience associated with the data streams received from other of the plurality of communication devices.

* * * * *